No. 754,496. PATENTED MAR. 15, 1904.
C. W. POTTER.
LIMITING DEVICE FOR ELECTRIC CIRCUITS.
APPLICATION FILED FEB. 10, 1902.
NO MODEL. 2 SHEETS—SHEET 1.

No. 754,496. Patented March 15, 1904.

UNITED STATES PATENT OFFICE.

CHARLES WINFIELD POTTER, OF DENVER, COLORADO.

LIMITING DEVICE FOR ELECTRIC CIRCUITS.

SPECIFICATION forming part of Letters Patent No. 754,496, dated March 15, 1904.

Application filed February 10, 1902. Serial No. 93,410. (No model.)

*To all whom it may concern:*

Be it known that I, CHARLES WINFIELD POTTER, a citizen of the United States, residing at Denver, in the county of Arapahoe and State of Colorado, have invented certain new and useful Improvements in Limiting Devices for Electric Circuits, of which the following is a specification.

My invention relates to improvements in devices for automatically controlling and regulating the consumption or use of electric currents.

Many consumers of electric current desire to make a contract for a specified amount of current, and when such a contract is made it will be useless or undesirable to install a meter to record the amount of current used. Without a meter it is seen that current may be used in excess of the amount contracted for, and this without the knowledge of the electric company. I have therefore provided a device which is connected to the mains at the meter-loop, which device is set or adjusted so that upon any increase of the load above the amount contracted for the device will automatically cut off the current, and thus the consumer will be notified that he is using more current than is allowed by his contract.

Figure 1:
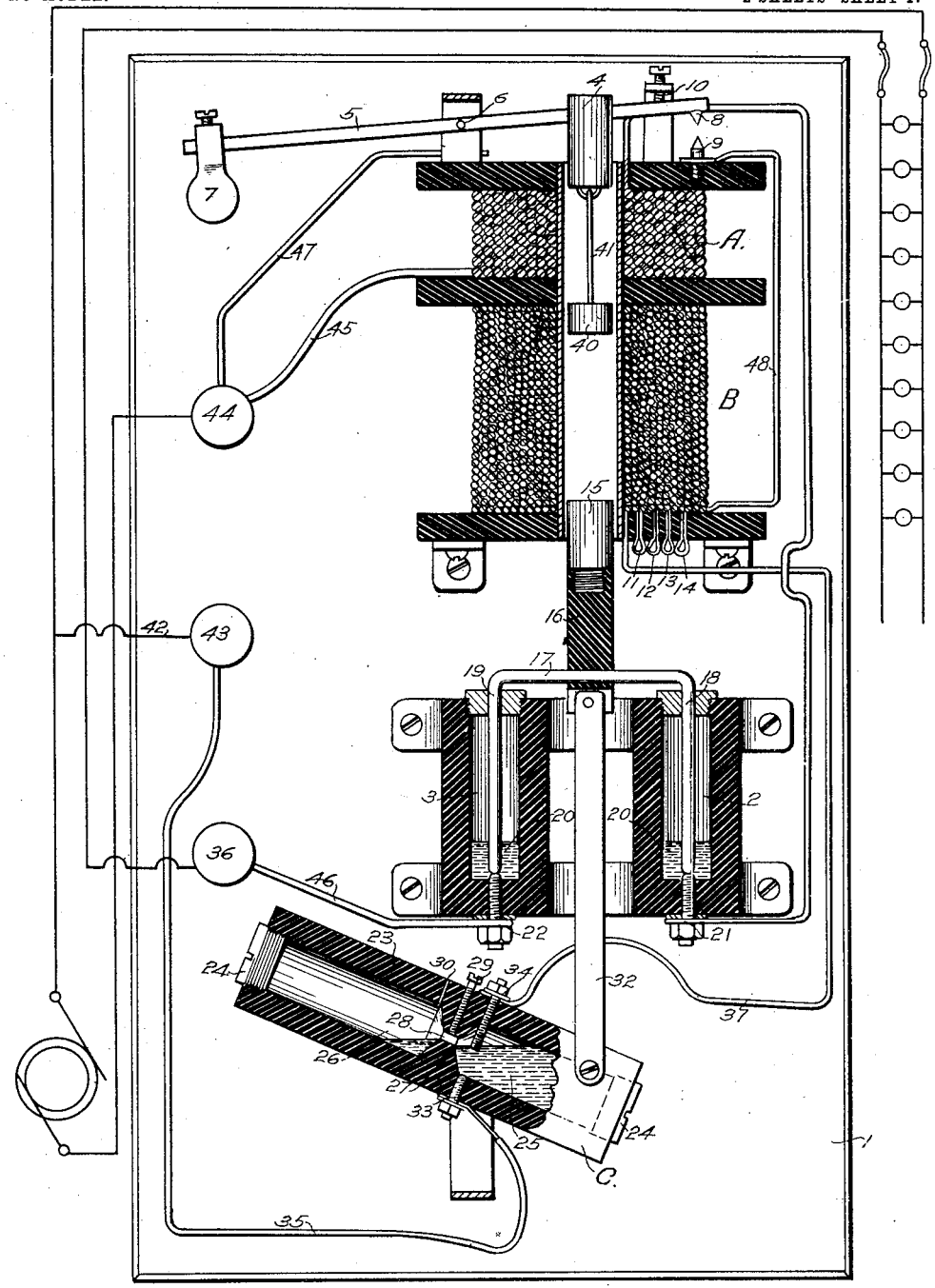
Figure 2:
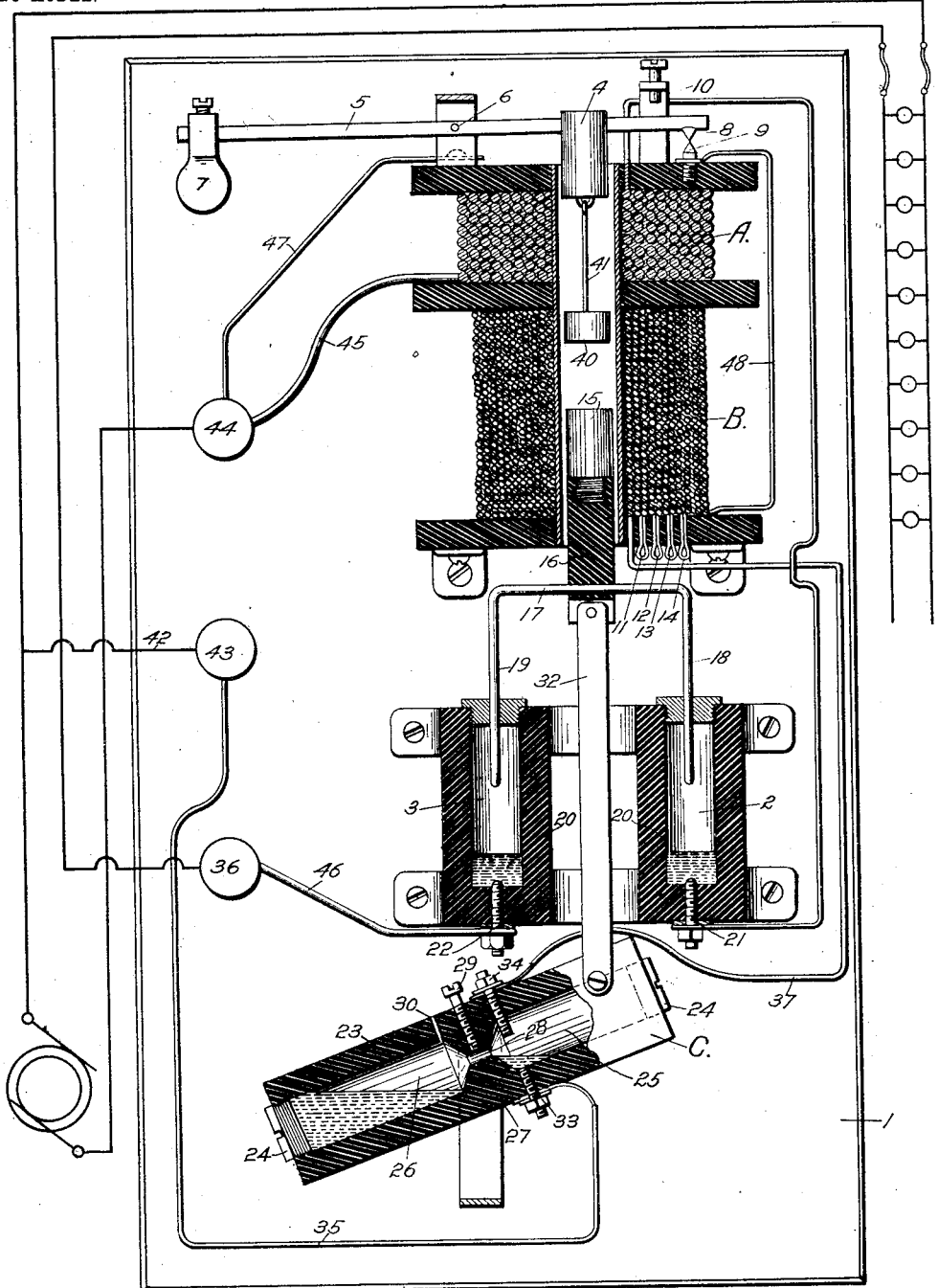

Referring to the drawings, Figure 1 shows the several parts of my device in vertical transverse section, the parts being shown in their positions when the load is normal or less. Fig. 2 is a similar view, the parts being shown in the positions when the load is increased above the amount agreed upon in the contract.

My device as shown consists of a base-plate 1, and a series solenoid A, mounted thereon, a shunt-solenoid B, the mercury-cups 2 and 3, the tilting timing device C, and suitable wires connecting the operative integral parts of the device. The series solenoid A is connected constantly in series with the load and is so wound with heavy wire as to be able to carry the entire load.

The armature 4 of the series solenoid A hangs at the upper end of the hollow core and is supported from a rod 5, which is pivoted at 6. Movable along the rod 5 is the adjustable weight 7, and at the other end of the weighted rod is a platinum point 8, which upon the depression of that end of the rod contacts with the platinum point 9. The adjustable weight 7 constantly tends to hold the armature 4 out of the hollow core of the series solenoid and against the pull thereof. A stop-block 10 limits the upward movement of the rod. Below said series coil and separated from it by a thin plate of insulating material is another solenoid B, which I shall hereinafter refer to as the "shunt" coil or solenoid. This shunt-solenoid is placed so that its hollow core will be concentric with the hollow core of the series solenoid and is so wound that unlike poles of the two coils are adjacent. The resistance of this coil is high enough so that it may be connected directly across the mains. At several points taps 11 12 13 14 are brought out to allow adjustment for different frequencies and voltage.

The main armature 15 of the shunt-solenoid slides in the lower end of the coil. The bottom of the armature 15 is tipped with fiber. Passing through this tip 16 is a yoke 17, having the arms 18 and 19, which normally rest on the bottoms of the mercury-cups 2 and 3 and support the armature 15, so as to be within the influence of the shunt-solenoid.

A small quantity of mercury 20 is placed in the bottoms of the mercury-cups for the purpose of securing a good contact between the yoke-arms and the connecting-screws 21 22, which penetrate the bottoms of the cups.

Below the mercury-cups I provide a tilting timing device C, which consists of a cylinder 23, of non-conducting material, preferably fiber, which is partially filled with mercury and closed at both ends by the screw-plugs 24 24. The cylinder is divided into two chambers 25 26 by a central partition 27. A small port or passage 28 in said partition permits the flow of mercury from one chamber to the other. The area of this port is regulated by a choke-screw 29, and hence the time of the flow of mercury from one chamber to the other may be regulated. A small vent-hole 30 in the top of the chamber 26 is provided to equalize the air-pressure in the chambers.

The cylinder of the timing device rocks on bearings about midway its length and is connected at one end to the main armature 15 of the shunt-coil by the connecting-rod 32. Contact-screws 33 34 penetrate the cylinder at points near the partition and connect with the mercury in the chamber 25. From one of these contact-screws 33 a flexible cable 35 leads to the binding-post 43, and from the other, 34, a flexible cable 37 connects with the inner terminal of the shunt-coil.

The supplementary armature 40 of the shunt-solenoid is suspended from the armature 4 of the series solenoid by means of a non-magnetic rod 41 and hangs just within the top of the core of the shunt-coil. The purpose of this supplemental armature 40 of the shunt-coil will be presently stated.

The series solenoid of the device is normally in series with the load through connections made to the binding-posts 44 and 36.

A shunt-wire 42 leads from the binding-post 43 to the opposite side of the circuit.

We will assume that the current passes into the device through the post 44 and that the weight 7 is set to resist the pull of the coil on the armature 4 of the series solenoid. The current will pass through the binding-post 44 along the wire 45 through the series coil A and to the mercury-cup 2, thence over the connecting-yoke 17 through the other mercury-cup 3, and from there over the wire 46 to the post 36. Now if the load were increased the pull of the series coil would likewise be increased, and the armature 4 would be attracted, so that the platinum point 8 on the end of the weighted rod would come in contact with the platinum point 9, secured on the head of the series solenoid, and in consequence the shunt-solenoid will be connected directly across the mains through the wire 47, leading to the post 44. The path of this auxiliary circuit will then be as follows: from post 44 over wire 47 to rod 5, thence to the platinum points 8 and 9, from there over wire 48 to and through the shunt-coil and over wire cable 37 to the timing device, and from there to post 43, which is connected to the opposite side of the circuit. When the shunt-coil is energized, its main armature will be pulled up and will lift the arms 18 and 19 of the connecting-yoke 17 out of the mercury-cups, and so open the series circuit and cut off the load. At the same time the armature 15 will pull up the connecting-rod 32 and tilt or rock the timing device, so that the mercury in the cylinder of the timing device will begin to run from chamber 25 into chamber 26. Although the series solenoid is now cut out, the rod 5 is now held down by the pull of the shunt-coil on the supplemental armature 40, thereby maintaining the auxiliary circuit and keeping the shunt-coil energized. This will continue until the auxiliary circuit is broken by the mercury running out of the chamber 25 and breaking the current between the connecting-screws 21 and 22. The shunt-coil is now dead, so its armature and the yoke 17 drop down and reconnect the load to the main circuit. If the overload continues, the rod will again be pulled down by the series solenoid A; otherwise it will be raised by the weight. Should the overload still continue, the device will again operate, but not until the mercury has run back from chamber 26 into chamber 25 and completely fills it. This will give sufficient time for a fuse to blow in case of a short circuit.

Although this device was designed principally to regulate the consumption of current on the consumer's premises, yet it is obvious that by making the several parts of suitable proportions it may be applied in the power-station as a circuit-breaker to relieve generators of momentary overloads.

I claim—

1. In a device of the character described and in combination, a solenoid of low resistance normally in series with the load, a solenoid of relatively high resistance, means operative by said low-resistance solenoid adapted to connect said high-resistance solenoid across the mains, means operative by said high-resistance solenoid adapted to break the circuit through the low-resistance solenoid and load, means operative by said high-resistance solenoid to maintain its connection across the mains at one point and means consisting of a device having timed movements in two directions and operative by its movement in one direction to consecutively open the shunt-circuit in two places, and to close one break in the shunt-circuit by its movement in the other direction, substantially as described.

2. In a device of the character described and in combination, a solenoid of low resistance normally in series with the load, a solenoid of relatively high resistance, means operative by said low-resistance solenoid adapted to connect said high-resistance solenoid across the mains, means operative by said high-resistance solenoid adapted to break the circuit through said low-resistance solenoid and load, means operative by said high-resistance solenoid to maintain its connection across the mains at one point, with a device having timed movements and adapted to consecutively open the shunt-circuit in two places, substantially as described.

3. In a device of the character described, a solenoid of low resistance normally in series with the load, a solenoid of relatively high resistance, means for disconnecting said series solenoid, means simultaneously connecting or shunting said high-resistance solenoid across the mains, in combination with a tilting timing device consisting of a cylinder of non-conducting material pivoted about mediately of its length and interiorly divided into two chambers by a ported partition, and provided with a quantity of mercury in its said chambers, electric terminals penetrating one of said chambers and adapted to be connected upon the filling of said chamber with the mercury substantially as described.

4. In a device of the character described, a coil of low resistance normally in series with a predetermined load, its armature, means adapted to exert a counter pull on said armature slightly greater than the pull of said coil, a coil of high resistance located below said low-resistance coil and having its hollow core concentric therewith, means operative by the armature of the series coil to shunt the high-resistance coil on the mains, means operative by the shunt-coil to disconnect the series coil, in combination with means operative by a supplemental armature in the top of said high-resistance coil adapted to maintain connection on the mains substantially as described.

5. In a device of the character described, the combination with a coil of low resistance normally in series with a predetermined load, its armature, means adapted to exert a counter pull on said armature slightly greater than the normal pull of said coil, a coil of relatively high resistance placed below the series coil and having its hollow core concentric therewith, an armature in the lower end of said high-resistance coil, means for shunting said high-resistance coil on the mains, and means connected with and adapted to be operated by the armature of the high-resistance coil to open and to close at predetermined intervals the circuit through the series coil, substantially as described and for the purposes stated.

6. In a device of the character described, the combination with a coil of low resistance normally in series with a predetermined load, its armature, means adapted to exert a counter pull on said armature slightly greater than the normal pull of said coil, of an adjacent coil of relatively high resistance, its armature, means for shunting said high-resistance coil across the mains, and means connected with and adapted to be operated by said high-resistance-coil armature to open and to close, at predetermined intervals, the circuit through the series coil, substantially as described and for the purpose stated.

7. In a device of the character described, a coil of low resistance normally in series with a predetermined load, its armature, means connected with and adapted to exert a counter pull on said armature slightly greater than the normal pull of said coil, an adjacent coil of relatively high resistance, its armature, in combination with means connected with and adapted to be operated by the armature of said high-resistance coil to open and to close, at predetermined intervals, the circuit of the low-resistance coil, and means consisting of a mediately-pivoted cylinder of non-conducting material interiorly divided into two chambers by a ported partition, a quantity of conducting fluid contained in said cylinder and adapted to run from one chamber to the other through said ported partition, terminals on the line of the coil of high resistance penetrating said cylinder into one of its chambers and adapted to be electrically connected by the inflowing conducting fluid therein and electrically disconnected by the outflow of said fluid upon the tilting of said pivoted cylinder, whereby to make and break the circuit through the coil of high resistance at predetermined intervals, substantially as described and for the purpose stated.

8. In a device of the character described, a solenoid of low resistance normally in series with the load, its armature, means connected with and adapted to exert a counter pull on said armature slightly greater than the pull of the solenoid, an adjacent relatively high resistance solenoid, its armature, means connected with and adapted to be operated by the armature of the low-resistance solenoid to close the circuit through the high-resistance solenoid, means connected with and adapted to be operated by the armature of the high-resistance solenoid to open and to close the circuit through the low-resistance solenoid, in combination with means for opening and closing the circuit through the high-resistance solenoid at predetermined intervals consisting of a mediately-pivoted cylinder of non-conducting material interiorly divided into two end chambers by a ported partition, a quantity of conducting fluid contained in said cylinder and adapted to run from one chamber to the other through said ported partition, electric terminals on the line of said high-resistance solenoid penetrating said cylinder into one of its chambers and adapted to be electrically connected by the inflowing conducting fluid therein and electrically disconnected by the outflow of said fluid upon the tilting of said pivoted cylinder, substantially as described and for the purpose stated.

In testimony whereof I affix my signature in presence of two witnesses.

CHARLES WINFIELD POTTER.

Witnesses:
W. H. MOSES,
A. ROLAND JOHNSON.